United States Patent

Hoppl et al.

[15] 3,637,233
[45] Jan. 25, 1972

[54] TRANSPORT MECHANISM FOR A SURGICAL MICROSCOPE

[72] Inventors: Josef K. Hoppl; Helmut A. Golda, both of Lindenhurst, N.Y.

[73] Assignee: J. K. Hoppl Corporation, Lindenhurst, N.Y.

[22] Filed: Oct. 13, 1969

[21] Appl. No.: 865,755

[52] U.S. Cl. .......................... 280/43.14, 248/124, 248/43.17
[51] Int. Cl. ........................................................ B62d 21/18
[58] Field of Search .................. 280/43, 43.24, 43.17, 43.14; 248/124, 125, 129

[56] References Cited

UNITED STATES PATENTS

| 1,813,383 | 7/1931 | Chesney et al. | 248/124 |
| 1,973,372 | 9/1934 | Clapp | 280/43.14 |
| 3,080,196 | 3/1963 | Darby | 280/43.14 |
| 3,263,765 | 8/1966 | Just et al. | 280/43.24 |

FOREIGN PATENTS OR APPLICATIONS

| 1,058,435 | 5/1959 | Germany | 280/43.14 |

Primary Examiner—Leo Friaglia
Assistant Examiner—Robert R. Song
Attorney—Weingarten, Maxham & Schurgin

[57] ABSTRACT

An improved microscope for ophthalmic surgery of the type comprising a base member, an adjustable support member extending upwardly therefrom and means projecting from the support member to suspend the optical components of a microscope and related auxiliary equipment above the operating area. The improvement resides in a novel arrangement of structural elements providing a base member adapted to facilitate movement of the microscope from place to place within the general area of the operating room, which base member is advantageously integrated with other structural components of the microscope.

5 Claims, 3 Drawing Figures

3,637,233

TRANSPORT MECHANISM FOR A SURGICAL MICROSCOPE

FIELD OF THE INVENTION

The invention relates in general to surgical microscopes especially suited to ophthalmic surgery, and more particularly to a novel base member therefor and the integration of the base member with other structural elements and components of such microscopes.

DISCUSSION OF THE PRIOR ART

Surgical microscopes useful in diagnostic and therapeutic procedures, particularly for ophthalmic surgery, are known to the art. In general, microscopes of this type are relatively expensive, bulky and complicated, and are often mounted in substantially fixed relationship with an operating table or examination chair. Such features are primarily required to eliminate vibrations or like undesirable movements of the optical components during operation. Also these features are employed to assure positive performance reliability, thereby minimizing distractions which could impair the concentration required in the medical procedure. However, such features of present ophthalmic microscopes are unduly restrictive and tend to limit the use and the availability thereof to specialized facilities. Those prior instruments which are generally termed "portable" are often heavy stationary machines which may, by force, be moved a short distance by sliding. The danger of upending such a machine or damaging the precision parts thereof is ever present when such a move is attempted. Other portable microscopes of this type are constructed to stand permanently upon casters or other friction reducing devices which are capable of being locked in position with suitable braking means. Instability in use is a significant disadvantage of this instrument because such support means cannot normally be made sufficiently secure to avoid jiggle when the microscope is bumped.

SUMMARY OF THE INVENTION

Broadly speaking, there is herein disclosed a microscope which is particularly adapted for use in ophthalmic surgery and having the generally required characteristic of stability during use, together with the flexibility afforded by a mechanism which permits the microscope to be readily transported from place to place.

One of the essential factors contributing to the overall achievements and advantages of the present invention resides in the novel design of the base member and the integration of this member with other structural elements or components to present a total microscope especially useful for ophthalmic surgery. The base member of the microscope of this invention is sturdy and stable in appearance as well as in performance, while providing means to easily move the microscope from place to place. The specific means to provide this mobile capability are remarkably sturdy, simple and reliable in operation.

BRIEF DESCRIPTION OF THE DRAWING

The invention will be readily understood when the detailed description thereof is read in conjunction with the drawing wherein.

DESCRIPTION OF THE PREFERRED EMBODIMENT

Figure 1:
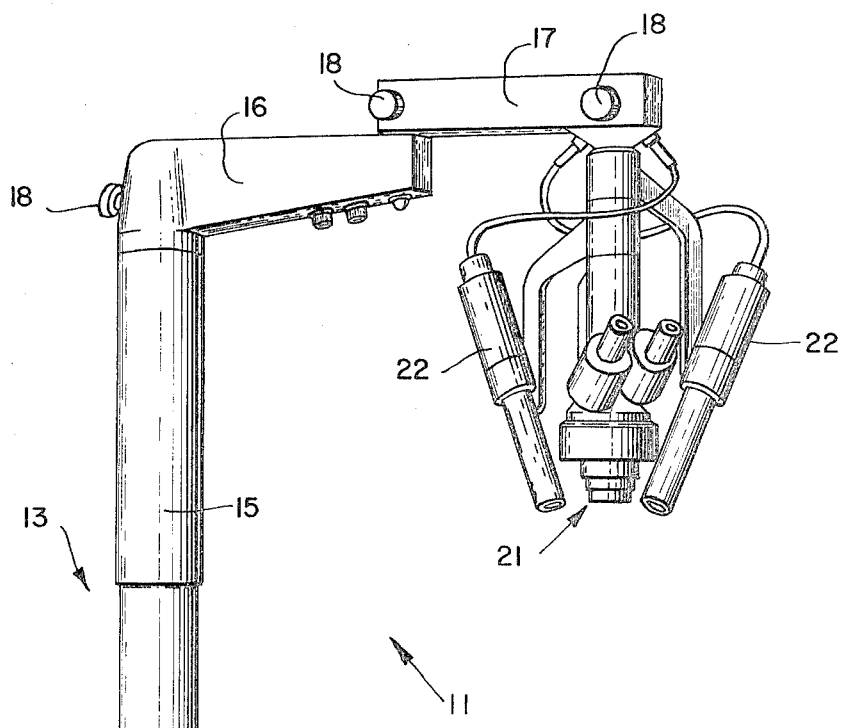
FIG. 1 is a perspective view of a surgical microscope of the type to which the present invention pertains.
Figure 1:
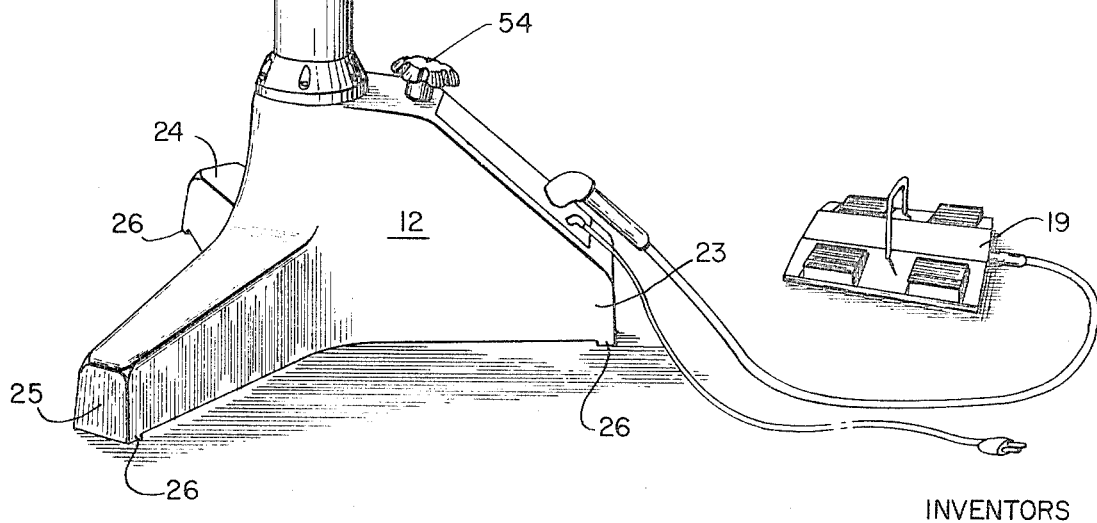

Referring now to FIG. 1, there is illustrated a surgical microscope, referred to generally by reference numeral 11, comprising a base member 12, an adjustable support column 13 comprising two telescopically connected members 14 and 15 extending upwardly from the base member, and projection arms 16 and 17 adapted to suspend the optical components 21 and associated lighting devices 22 above the desired operating area. Lower column member 14 is securely affixed to base member 12 by suitable means such as bolts or the like, while upper column member 15 is arranged in slidable communication with member 14. In this fashion the overall height of support member 13 can be adjusted within certain prescribed limits. Projection arm 16 is pivotally connected to upper column member 15, projection arm 17 is pivotally connected to arm 16 and optical components 21 are pivotally connected to projection arm 17. Suitable locking devices 18 are provided for securing each of these pivoted members in any desired position. Lights 22 may be twin "cool" lights angled for oblique illumination and arranged so that each light may be rotated at least 180° about the operative field, always in perfect focus with the optical component. However, the more likely configuration for microscope 11 is one cool light and one slit lamp to provide more intense illumination of a particular area.

Foot control 19 is included with microscope 11 and controls the focusing and magnification of the microscope, thereby leaving the practitioner's hands free for operative purposes. It is evident from the above description that the optical and lighting components have practically unlimited freedom of movement in the immediate operating area while the base and support members are quite stable with respect to the operating room floor.

In the surgical microscope of FIG. 1, focus control of optical components suspended on projection arms 16 and 17 is achieved by adjusting the overall height of the support column 13. Details relating to a specific and especially advantageous means for adjusting the height of said support column may be found in the commonly owned U.S. Pat. application Ser. No. 865,751 filed by the present inventors on even date herewith, now U.S. Pat. No. 3,612,468.

It may be readily appreciated that the arrangement of the support column and projection means provides a structure which could conceivably present stabilization problems, especially when the microscope is moved from place to place. However, in accordance with the practice of the present invention it has been discovered that a specific base member configuration can be advantageously employed to maintain the microscope in a remarkably stable, fixed position position during operation as well as providing simple but especially efficient means for moving the microscope about on its supporting surface. The specific means and the structural elements of the base member transport mechanism as well as the manner in which the elements may be arranged and combined are described in detail with reference to FIGS. 2 and 3.

Base member 12 is preferably a rigid casting, normally made of aluminum, which is substantially hollow. The casting may be made in any of several shapes but the tripod configuration shown, having legs 23, 24 and 25, is especially preferred for maximum stability. Leg 23 is larger and wider than the other legs, so constructed to support and house the power unit which includes power transformers and other electrical components. The bottom of casting 12 is formed with downward projecting feet 26 at the ends of the legs to enable the microscope structure to rest solidly on any relatively flat surface. These downward projecting feet may be any practical size and shape since their function is to provide three-point contact with the supporting surface. Top 27 of casting 12 has a large hole 28 therethrough and a plurality of tapped holes 29 for purposes of mounting the support column thereon. For purposes of clarity, the power unit and column 13 and its associated components are omitted from FIG. 2.

A baseplate 32 is securely attached to base member 12 in a conventional manner such as by bolts or welding to projections 33 on the interior walls of the base member. The baseplate is shown as a flat, three-armed plate closely conforming to the internal shape and dimensions of base member 12 in the horizontal plane in which it resides near the bottom of the base member.

Although baseplate 32 is shown secured to the casting only slightly above the surface upon which the microscope rests, it is possible that it may be secured to the interior of casting 12 at a somewhat different level, so long as feet 26 are the only parts of the base member which make contact with the floor. Also it is conceivable that baseplate 32 may be shaped differently, requiring somewhat modified provisions for securing it to the base member. In effect, the shape of the base member need not necessarily govern the shape of the plate.

Each arm of baseplate 32 is provided with a pivot means comprising a pair of pillow blocks 34 and a shaft 35 rotatably connected between the pillow blocks. The shafts are captured by the walls of base member 12 and are otherwise freely held in holes in the pillow blocks. A primary roller member 36 and a plurality of subordinate roller members 37 are pivotally mounted to baseplate 32 by the pivot means. For purposes of strength, ease of manufacture and structural efficiency, members 36 and 37 are preferably fabricated in the form of rigid channels although other configurations could well be satisfactory. Roller member 36 is shown having a heavy duty dual-wheel swivel caster 41 mounted within its channel to L-shaped plate 42 which is secured to the roller member by welding or other suitable means. To provide for such mounting, a portion of the bed of channel 36 is removed, providing space to allow caster 41 to swivel freely. Subordinate roller members 37 are provided with smaller heavy duty single wheel casters 43 which are mounted within the inverted channels 37 to the beds thereof. Screws 44 may be used for mounting casters 41 and 43. Roller members 36, 37 are arranged so that they extend outwardly from approximately the central region of base member 12 within legs 23, 24, 25 thereof but terminate short of the internal boundaries of these legs. Moreover, the arrangement is such that members 36, 37 pivot freely about the axis of their respective pivot means, wherein shafts 35 pass through the perpendicular walls 45 of each roller member. It should be noted that with the embodiment shown in the drawing, there are two subordinate roller members. However, if it is desired for any reason to increase the number of legs of base member 12 or to increase the number of arms of baseplate 32, the number of subordinate roller members could be increased accordingly. Whatever the number of subordinate roller members, only one primary roller member is necessary to operate the transport mechanism within the base of the microscope.

Figure 2:
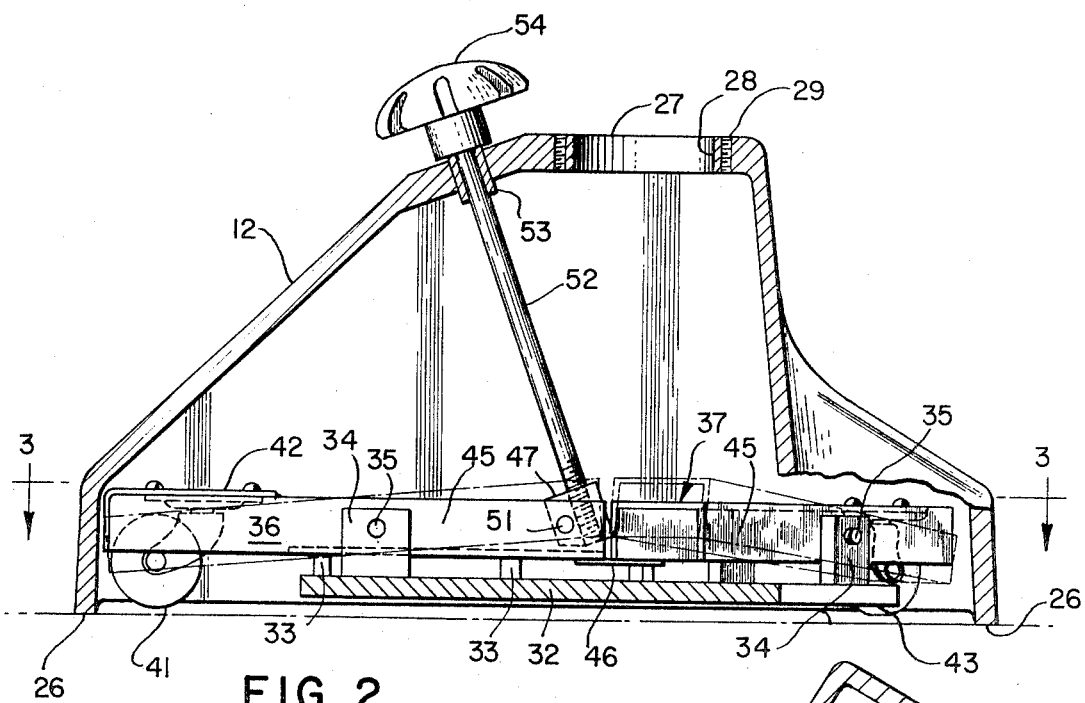
FIG. 2 is an enlarged sectional view of the base of the microscope of FIG. 1 taken through cutting plane 2—2 of FIG. 3, having a portion of one leg broken away.

Because of the function it must perform, roller member 36 is preferably somewhat larger and more sturdy than roller members 37. Primary roller member 36 is provided with an extension 46 which may be merely a portion of the bed of the channel having walls 45 removed, or it may be an additional plate attached to the under side of the channel member by some suitable means such as welding, as shown in FIG. 2. The inner ends of one wall 45 of each subordinate roller member 37 rests upon extension 46. With the cooperative structure, it may be appreciated that by lifting the inner end of roller member 36, the outer ends of roller members 36, 37 are lowered and reach a point below the plane of the bottom of base member 12 whereby the entire microscope 11 is raised off the floor to rest upon casters 41, 43. In this condition the microscope is fully mobile and may easily be moved from place to place or from room to room. When the microscope has been relocated at the desired location, the casters of the transport mechanism are raised within base member 12 by lowering the inner ends of the roller members and the microscope once again rests firmly on the floor upon feet 26.

The distance casters 41, 43 may be raised off the floor into casting 12 is governed by the distance the inner ends of roller members 36, 37 may travel downward before contacting baseplate 32. Likewise the distance the microscope may be raised off the floor may be governed by the distance members 36, 37 are allowed to travel before contacting the outer edges of the arms of baseplate 32, which depends also upon the length of these arms. Of course, they must be sufficiently shorter than the legs of base 12 to permit the casters to swivel freely. The raising distance may also be governed by the characteristics of the mechanism for raising the inner ends of the roller members which is described below. By mounting extension 46 onto the outside of the channel bed of member 36 as a separate piece as shown, each of roller members 36, 37 may be mounted to baseplate 32 in identical fashion with shafts 35 being the same distance above baseplate 32, since the inner ends of these pivotable roller members are all in the same plane and remain together when their ends are raised and lowered. FIG. 2 shows the transport mechanism in retracted position in full lines and in extended position in dotted lines.

Figure 3:
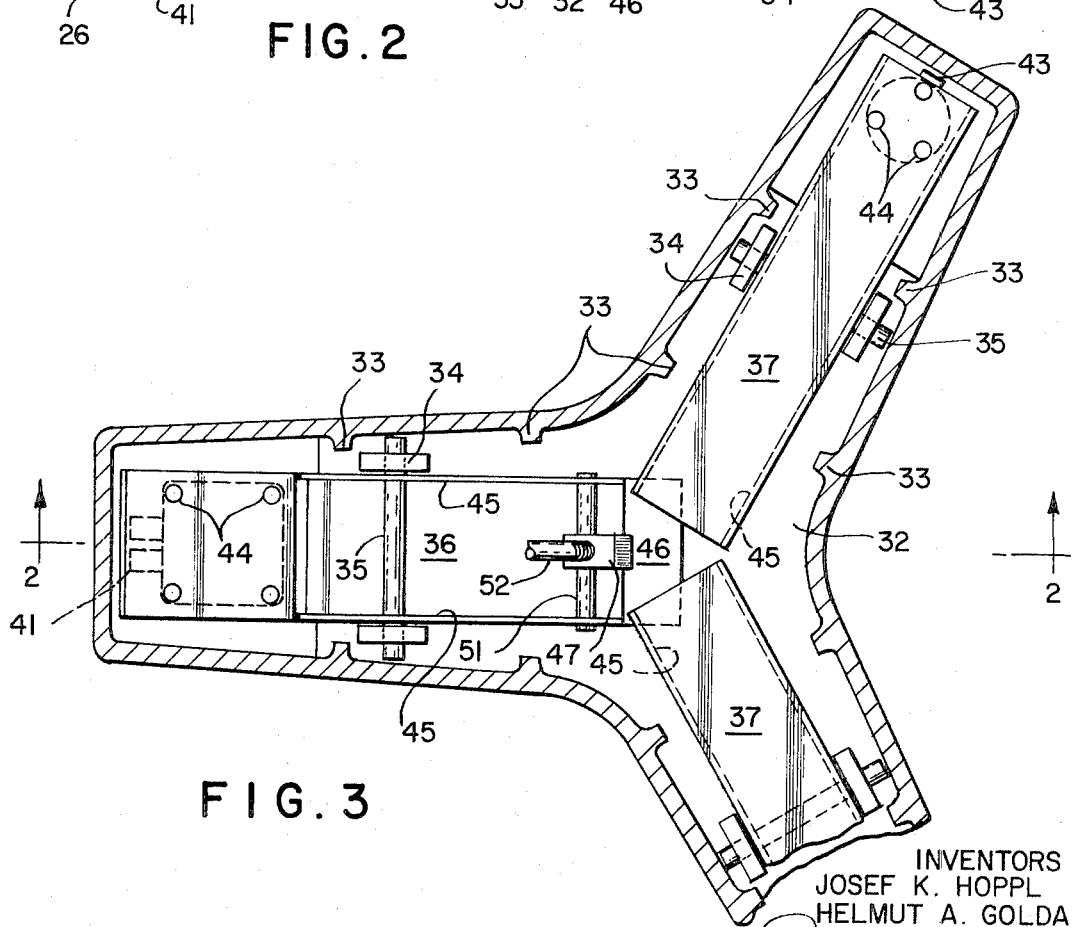
FIG. 3 is a sectional view taken through cutting plane 3—3 of FIG. 2.

A simple and very functional means for raising and lowering the inner end of primary roller member 36 is illustrated in FIGS. 2 and 3. A threaded actuator nut 47 is pivotally mounted on shaft 51 near the inner end of roller member 36. Shaft 51 is rotatably secured to the roller member in a conventional manner, such as by the use of snaprings on each end. Threaded shaft 52 is operationally arranged in combination with nut 47 and extends upwardly therefrom through casting 12 by way of bearing 53 and terminates with handle 54. By rotating handle 54 in one direction, the inner ends of roller members 36, 37 are simultaneously raised, thereby engaging casters 41, 43 with the floor and maintaining the casters so engaged so that the microscope can be easily moved from place to place. Alternately, by rotating handle 54 in the opposite direction, the inner ends of members 36, 37 are lowered and the microscope is again placed in a solidly fixed stable relationship with the floor. Other raising and lowering mechanisms of differing complexity may be used if desired. One example would be to motorize shaft 52, another would be to use a lever mechanism having a pivotable elongated handle extending from base member 12. Such a handle could be pivoted to one position to raise the microscope onto the casters and then serve as a handle for pulling the instrument about.

Those skilled in the art will readily appreciate many of the significant advantages obtained by integrating the specific base member of the present invention with other structural elements of ophthalmic microscopes of the type to which the present invention pertains. This invention provides a microscope adapted for surgical use which is very stable when desired and provides a wide variety of adjusted positions for the optical apparatus thereof during operations, and yet is fully portable by means of retractable casters. These objectives are accomplished in a positive, efficient, but surprisingly simple and inexpensive fashion.

Having described the invention together with a preferred embodiment thereof, as well as a manner of practicing same, it is likely that modifications and improvements will now occur to those skilled in this art which are within the scope of the herein described invention. Such modifications which are contemplated by this invention include the use of ball casters or other type friction reducing means in place of the swivel casters described. Also, the roller members may be shaped differently or inverted from the orientation shown.

What is claimed is:

1. A transport assembly for a surgical microscope comprising:
   a base member formed with a plurality of legs, a closed top and an open bottom;
   means connected to said base member for suspending the optical components of said microscope above the operating area; and
   transport mechanism within said base member comprising:
   a baseplate secured to and within said base member adjacent the bottom thereof in parallel relationship to the supporting surface upon which said microscope is adapted to rest, said baseplate extending outwardly within each of said legs and terminating short of the ends of said legs leaving downwardly directed open areas in the ends of said legs;

an elongated, substantially rigid primary roller member pivotally connected intermediate its ends to and above said baseplate within said base member, the inner end of said primary roller member being formed with an inwardly projecting extension;

a primary caster secured to the outer end of said primary roller member and located in said open areas;

a plurality of elongated, substantially rigid subordinate roller members pivotally connected intermediate their ends to and above said baseplate within said base member, the inner ends of said subordinate roller members extending to a position above in resting relationship and being supported by said extension on said primary roller member;

a subordinate caster secured to the outer end of each of said subordinate roller members and located in said open areas; and actuator means pivotally secured to said primary roller member at a location displaced inwardly from its pivot connection, said actuator means extending generally upward through the top of said base member and being adapted to raise the inner end of said primary roller member together with the inner ends of said subordinate roller members to thereby project said primary and subordinate casters through said open areas below the plane of the bottom of said base member, thereby making contact with and lifting said microscope from the supporting surface, said actuator means also being adapted to retract said outer end of each of said roller members within said base member.

2. The transport assembly recited in claim 1, wherein: said base member is a hollow casting having three legs, each being formed with a downward projecting foot adapted to make firm and stable contact with the supporting surface.

3. The transport assembly recited in claim 1, wherein: said actuator means comprises:

a threaded actuator nut pivotally connected to the inner end of said primary roller member;

a threaded shaft rotatably mounted in and projecting externally from said base member, said shaft being threaded together with said actuator nut; and means external of said base member for turning said shaft;

whereby said inner ends of said roller members are raised and lowered by properly rotating said turning means.

4. For use in a floor mounted surgical microscope supported by a hollow base member having three legs radiating outwardly from the center thereof, a closed top and an open bottom, a transport mechanism comprising:

a baseplate secured within said base member parallel with the plane of the bottom thereof, said baseplate being formed with three arms and conforming generally to the shape of the interior of said base member at the plane in which it resides, the arms of said baseplate being substantially shorter than the legs of said base member leaving downwardly directed open areas in the ends of said legs;

pivot means mounted on each arm of said baseplate, said pivot means comprising a pair of pillow blocks secured to said baseplate on either side of the arm of said baseplate, and a shaft rotatably mounted in said pillow blocks, the length of said shaft being substantially equal to the inside width of the leg of said base member in which it resides;

a primary roller member pivotally connected to one of said pivot means and extending past the end of the arm of said baseplate upon which is is mounted to a point just short of the interior end wall of the leg of said base member in which it resides;

two subordinate roller members each being pivotally connected to one of the remaining pivot means, each of said subordinate roller members extending past the end of the arm of said baseplate upon which is is mounted to a point just short of the interior end wall of the leg of said base member in which it resides;

a swivel caster assembly secured to and projecting downwardly from each of said roller members in said open areas;

means secured to the inner end of said primary roller member with which the inner ends of said subordinate roller members make contact in resting relationship so that when said inner end of said primary roller member is moved up and down, the inner ends of said subordinate roller members move up and down with it; and means secured adjacent the inner end of said primary roller member and extending through the wall of said base member for raising and lowering the inner end of said primary roller member;

whereby upon raising the inner ends of said roller members, the outer ends thereof are pivoted downwardly so that said casters project through said open areas to engage the floor upon which said microscope rests and raise said microscope off the floor onto said casters thereby making said microscope portable; and whereby upon lowering the inner ends of said roller members, the outer ends thereof are retracted within said base member and said base member provides stable support for said microscope.

5. The transport mechanism recited in claim 4, wherein: said raising and lowering means comprises:

a threaded actuator nut pivotally secured to the inner end of said primary roller member;

an actuator rod threaded at one end and engaging the threaded actuator nut, the other end extending through the top of said base member;

means secured to said base member for preventing longitudinal movement of said actuator rod; and means attached to said other end of said actuator rod adapted to provide rotation thereof;

whereby rotation of said actuator rod in one direction causes the inner ends of said roller members to be raised and rotation of said actuator rod in the other direction causes the inner ends of said roller members to be lowered.

* * * * *